3,389,134
PREPARATION OF ω-LAURINOLACTAM
Johan W. Garritsen, Geleen, and Johan A. Bigot, Beek, Limburg, Netherlands, assignors to Stamicarbon N.V., Heerlen, Netherlands
No Drawing. Filed Nov. 1, 1965, Ser. No. 505,970
Claims priority, application Netherlands, Nov. 3, 1964, 6,412,746
5 Claims. (Cl. 260—239.3)

ABSTRACT OF THE DISCLOSURE

A process for preparing ω-laurinolactam by reacting the hydrochloride of cyclododecanone oxime with hydrogen chloride in the presence of a polar organic solvent and then separating the ω-laurinolactam free base from the reaction mixture.

---

The present invention relates to the preparation of ω-laurinolactam by the Beckmann rearrangement of cyclododecanone oxime.

In German patent specification 1,094,263 the Beckmann rearrangement of cyclododecanone oxime hydrochloride is described, using sulphuric acid or oleum, to yield a reaction mixture from which the ω-laurinolactam can be separated by a water treatment, without neutralization.

In the U.S. patent application No. 367,212 of Garritsen et al., filed May 13, 1964, an improved process is disclosed in which cyclo-aliphatic ketoximes are converted to the corresponding lactams by reacting the said oxime, in the form of the oxime hydrochloride, with hydrogen chloride. The lactam is removed from this reaction product in the form of lactam hydrochloride. In order to obtain the lactam free base in such a process, the lactam hydrochloride had to be decomposed, as by neutralization.

The present invention now provides a still further improved process for specific preparation of ω-laurinolactam free base directly from cyclododecanone oxime. In this process said oxime is brought into reaction with hydrogen chloride and the reaction is carried out in the presence of a polar organic solvent. Without any intermediate decomposition steps the desired ω-laurinolactam free base can be directly separated from the polar reaction solvent.

Without being committed to this explanation, it appears that when this Beckmann rearrangement with hydrogen chloride is conducted in a solution of the cyclododecanone oxime in a polar solvent, the probable ω-laurinolactam hydrochloride intermediate product has a very poor stability and, in effect, decomposes in situ without any special treatment to the lactam free base. In this way, the free lactam can be recovered directly from the solution obtained as the reaction product of the rearrangement.

The process according to the invention may be conducted with cyclododecanone oxime in the form of the oxime hydrochloride as the starting material. As is known, the oxime will combine with an equimolecular amount of hydrogen chloride to form the oxime hydrochloride. The oxime hydrochloride can also absorb more hydrogen chloride and then changes into an oxime-hydrochloride oil, which oil can also be used as the starting material in the process according to the invention.

When use is made of oxime-hydrochloride oil, which contains more than the equimolecular amount of hydrogen chloride with respect to the oxime, e.g. 1.1 moles, 1.5 moles, 1.9 moles, or 2 moles of hydrogen chloride per mole of oxime, the starting material already contains sufficient hydrogen chloride to effect the rearrangement. However, to assume obtaining a complete rearrangement, some more hydrogen chloride is preferably added, e.g. from at least 2, 5, or 10 times the molar amount contained in the starting material. A stream of hydrogen chloride gas may also be passed through the reaction mixture in cycle and be recycled.

The polar solvents which may be used for carrying out the reaction are, for instance, the nitro compounds of hydrocarbons, such as nitromethane, nitropropane, (e.g. nitro-lower alkyls) nitrobenzene, (e.g. nitro-monocyclic carbocyclic aryls) nitrocyclohexane, (e.g. nitro-lower cycloalkyls), and halogenated hydrocarbons, such as chlorobenzene, chloroform, trichloroethylene, isopropyl chloride, (e.g. halo-lower alkyls and halo-monocyclic carbocyclic aryls) and also nitriles, such as acetonitrile, benzonitrile, adiponitrile, (e.g. lower alkyl-nitriles and monocyclic carbocyclic aryl nitriles).

By preference, a nitrile is used as the solvent, because a partial rearrangement with hydrogen chloride to an imide chloride is effected under the prevalent reaction conditions, as a result of which the rearrangement of the oxime hydrochloride is promoted and is completed in a short time of reaction. It would also be within the scope of this invention to introduce the imide chloride directly into the reaction mixture to achieve this effect.

The amount of solvent may be varied within wide limits. Use may be made of amounts of, e.g., at least about 200, 500 or 1000% by weight and also of smaller amounts of, e.g., at least about only 25 or 50% by weight with respect to the starting amount of oxime. When small amounts of solvent are used, part of the oxime may at first be present as a solid in suspension and be dissolved during the reaction. In addition, part of the resulting lactam may be contained in the reaction mixture as a solid, e.g. in a slurry in the reaction mixture.

The temperature at which the exothermic reaction is carried out is preferably kept between about 30° and 125° C. It is possible to start the reaction at a lower temperature, e.g. at room temperature, after which the temperature rises during the reaction from its own evolution of heat.

As to the pressure at which the reaction is carried out, there are no restrictions. Usually the reaction is carried out at atmospheric pressure as a matter of convenience, but higher pressures, e.g. 5, 10, 25, 50, 100 atm., or a still higher pressure may also be used if desired. When an elevated pressure is used, more hydrogen chloride may be contained in the reaction mixture. The reaction may also be carried out at reduced pressure. It is then possible to control the temperature and by regulation of the pressure so that the solvent used boils during the reaction, while part of it is discharged in the gaseous form and, after condensation, recycled.

In addition, the reaction may be carried out in the presence of catalysts. It has appeared that the formation of lactam is promoted by substances such as phosgene and halogenated organic nitrogen compounds, e.g. 1.3.5-trichloro-S-triazine, 2.4-dibromopyrimidine, imide chlorides (as mentioned above) such as 2-chloroazocycloalkene, and amide chlorides, such as 2-chloroazo-alkene. It is not necessary to use large amounts of the catalysts, a very small amount of at most about 0.1–1 mol percent, with respect to the oxime, being all that is required.

After completion of the reaction, the solvent can be removed, e.g., by distillation, which also removes the hydrogen chloride present, and the ω-laurinolactam free base can then be purified, e.g., by recrystallization, distillation, or washing with water.

Example 1

In a 1-litre reaction vessel provided with a stirrer, a reflux cooler and a gas-inlet tube, 39.5 grams of cyclododecanone oxime (0.2 mole) is mixed with 100 ml. of acetonitrile, after which 14.6 grams of hydrogen chloride gas (0.4 mole) is fed in at room temperature.

The solution is then heated to 65–70° C. and kept at this temperature for 15 minutes whilst hydrogen chloride is passed through, by which time the rearrangement reaction is complete. After the acetonitrile and the hydrogen chloride have been removed by distillation, the reaction product is distilled further.

The yield amounts to 37.1 grams of ω-laurinolactam free base (M.P. 154° C.), corresponding to an efficiency of 94%.

Example 2

The experiment described in Example 1 is repeated except that difference that, after the acetonitrile has been removed by distillation, the resulting crude ω-laurinolactam is washed with water.

The yield amounts to 38.7 grams of ω-laurinolactam free base (M.P. 151–152° C.) corresponding to an efficiency of 98%.

Example 3

The experiment described in Example 1 is repeated except that after the acetonitrile has been removed, the crude ω-laurinolactam is dissolved in chloroform. The solution is washed with water and the chloroform is subsequently evaporated.

The yield amounts to 38.8 grams of ω-laurinolactam free base (M.P. 152–153° C.), corresponding to an efficiency of 98%.

Example 4

A solution of 39.5 grams of cyclododecanone oxime in 100 ml. of xylene is heated to 60° C. and added to a solution of 15 grams of hydrogen chloride in 100 ml. of acetonitrile which is kept at 60–70° and which is contained in the apparatus described in Example 1.

After 15 minutes the reaction was complete, and the solvents and the hydrogen chloride were removed by evaporation. The resulting crude ω-laurinolactam free base was washed with water.

The yield amounts to 38.7 grams of ω-laurinolactam free base (M.P. 151–152° C.), corresponding to an efficiency of 98%.

The procedures of the foregoing examples may generally be repeated with one of the solvents identified above in place of the acetonitrile and with comparable results.

What is claimed is:

1. In the process for the preparation of ω-laurinolactam free base by reacting the hydrochloride of cyclododecanone oxime with hydrogen chloride, the improvement comprising conducting the reaction in the presence of a polar organic solvent and separating the resulting ω-laurinolactam free base from the reaction mixture.

2. The process of claim 1 wherein said polar organic solvent is selected from the class consisting of nitro-lower alkyls, nitro-lower cycloalkyls, halo-lower alkyls, halo-monocyclic carbocyclic aryls, lower alkyl-nitriles and monocyclic carbocyclic aryl nitriles.

3. Process according to claim 2, wherein the solvent used is a nitrile.

4. Process according to claim 1 wherein said solvent is present in a required amount of at least about 25% by weight with respect to the starting amount of said oxime.

5. The process according to claim 1 wherein said hydrogen chloride is present in at least equimolecular amount with respect to the said oxime.

References Cited

UNITED STATES PATENTS

| | | | |
|---|---|---|---|
| 2,234,566 | 3/1941 | Lazier et al. | 260—239.3 |
| 2,297,520 | 9/1942 | Wiest et al. | 260—239.3 |
| 2,883,377 | 4/1959 | Von Schick et al. | 260—239.3 |

OTHER REFERENCES

Chapman, "J. Chem. Soc.," pp. 1223–9 (1935).

JOHN D. RANDOLPH, *Primary Examiner.*

WALTER A. MODANCE, *Examiner.*

R. T. BOND, *Assistant Examiner.*